United States Patent
Vanselow

[19]

[11] Patent Number: 6,075,229

[45] Date of Patent: Jun. 13, 2000

[54] CUP WARMER HOLDER

[76] Inventor: Terry Vanselow, 18506 Smokey Point Blvd., Arlington, Wash. 98223

[21] Appl. No.: 09/015,106

[22] Filed: Jan. 29, 1998

[51] Int. Cl.[7] ................................................... F27D 11/02
[52] U.S. Cl. ................................................................ 219/432
[58] Field of Search .................................... 219/385–387, 219/432, 433, 436, 528, 529; 99/483

[56] References Cited

U.S. PATENT DOCUMENTS

| | | | |
|---|---|---|---|
| 1,414,494 | 5/1922 | Arntfield | 219/433 |
| 2,046,125 | 6/1936 | Lacy | 219/436 |
| 2,194,820 | 3/1940 | Connell et al. | 219/433 |
| 2,448,388 | 8/1948 | Plummer | 219/433 |
| 2,680,190 | 6/1954 | Schmidt | 219/432 |
| 3,432,641 | 3/1969 | Welke | 219/433 |
| 3,514,579 | 5/1970 | Sanders | 219/433 |
| 3,808,825 | 5/1974 | Ciurea | 291/386 |
| 4,160,152 | 7/1979 | Wightman et al. | 219/438 |
| 4,305,533 | 12/1981 | Wightman et al. | 219/432 |
| 4,442,343 | 4/1984 | Genuit et al. | 219/433 |
| 4,463,664 | 8/1984 | Peace | 219/433 |
| 4,523,083 | 6/1985 | Hamilton | 219/433 |
| 4,716,278 | 12/1987 | Cappe et al. | 219/387 |
| 5,019,691 | 5/1991 | Lai | 219/432 |
| 5,436,429 | 7/1995 | Cline | 219/528 |
| 5,700,991 | 12/1997 | Osbern | 219/432 |

FOREIGN PATENT DOCUMENTS

| | | | |
|---|---|---|---|
| 26756 | 4/1981 | European Pat. Off. | 219/433 |
| 421697 | 12/1934 | United Kingdom | 219/433 |

*Primary Examiner*—Joseph Pelham

[57] ABSTRACT

A new cup warmer holder for keeping beverages, such as coffee, hot while in a vehicle, such as a car. The inventive device includes a base having upper and lower surfaces with a receiving member extending from the upper surface. The receiving member has a central bore extending between its top and the bottom. A cup with an open top and a handle positioned towards its top is removably inserted through the top of the receiving member into the central bore of the receiving member. A heater is provided for heating an item within the central bore of the receiving member.

15 Claims, 3 Drawing Sheets

CUP WARMER HOLDER

BACKGROUND OF THE INVENTION

1. Field of the Invention

The present invention relates to cup warmers and more particularly pertains to a new cup warmer holder for keeping beverages, such as coffee, hot while in a vehicle, such as a car.

2. Description of the Prior Art

The use of cup warmers is known in the prior art. More specifically, cup warmers heretofore devised and utilized are known to consist basically of familiar, expected and obvious structural configurations, notwithstanding the myriad of designs encompassed by the crowded prior art which have been developed for the fulfillment of countless objectives and requirements.

Known prior art cup warmers include U.S. Pat. No. 4,829,981; U.S. Pat. No. 4,523,083; U.S. Pat. No. 4,320,626; U.S. Pat. No. 5,274,215; U.S. Pat. No. 4,980,539; and U.S. Pat. No. Des. 259,168.

While these devices fulfill their respective, particular objectives and requirements, the aforementioned patents do not disclose a new cup warmer holder. The inventive device includes a base having upper and lower surfaces with a receiving member extending from the upper surface. The receiving member has a central bore extending between its top and the bottom. A cup with an open top and a handle positioned towards its top is removably inserted through the top of the receiving member into the central bore of the receiving member. A heater is provided for heating an item within the central bore of the receiving member.

In these respects, the cup warmer holder according to the present invention substantially departs from the conventional concepts and designs of the prior art, and in so doing provides an apparatus primarily developed for the purpose of keeping beverages, such as coffee, hot while in a vehicle, such as a car.

SUMMARY OF THE INVENTION

In view of the foregoing disadvantages inherent in the known types of cup warmers now present in the prior art, the present invention provides a new cup warmer holder construction wherein the same can be utilized for keeping beverages, such as coffee, hot while in a vehicle, such as a car.

The general purpose of the present invention, which will be described subsequently in greater detail, is to provide a new cup warmer holder apparatus and method which has many of the advantages of the cup warmers mentioned heretofore and many novel features that result in a new cup warmer holder which is not anticipated, rendered obvious, suggested, or even implied by any of the prior art cup warmers, either alone or in any combination thereof.

To attain this, the present invention generally comprises a base having upper and lower surfaces with a receiving member extending from the upper surface. The receiving member has a central bore extending between its top and the bottom. A cup with an open top and a handle positioned towards its top is removably inserted through the top of the receiving member into the central bore of the receiving member. A heater is provided for heating an item within the central bore of the receiving member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cup warmer holder apparatus and method which has many of the advantages of the cup warmers mentioned heretofore and many novel features that result in a new cup warmer holder which is not anticipated, rendered obvious, suggested, or even implied by any of the prior art cup warmers, either alone or in any combination thereof.

It is another object of the present invention to provide a new cup warmer holder which may be easily and efficiently manufactured and marketed.

It is a further object of the present invention to provide a new cup warmer holder which is of a durable and reliable construction.

An even further object of the present invention is to provide a new cup warmer holder which is susceptible of a low cost of manufacture with regard to both materials and labor, and which accordingly is then susceptible of low prices of sale to the consuming public, thereby making such cup warmer holder economically available to the buying public.

Still yet another object of the present invention is to provide a new cup warmer holder which provides in the apparatuses and methods of the prior art some of the advantages thereof, while simultaneously overcoming some of the disadvantages normally associated therewith.

Still another object of the present invention is to provide a new cup warmer holder for keeping beverages, such as coffee, hot while in a vehicle, such as a car.

Yet another object of the present invention is to provide a new cup warmer holder which includes a base having upper and lower surfaces with a receiving member extending from the upper surface. The receiving member has a central bore extending between its top and the bottom. A cup with an open top and a handle positioned towards its top is removably inserted through the top of the receiving member into the central bore of the receiving member. A heater is provided for heating an item within the central bore of the receiving member.

Still yet another object of the present invention is to provide a new cup warmer holder that includes a plug adapted to fit into the electric cigarette lighter socket of a vehicle for powering the cup warmer with the electrical power provided from the vehicle.

Even still another object of the present invention is to provide a new cup warmer holder that provides a very stable means for holding a cup with a hot beverage to it so that the contents of the cup are not easily spilled.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
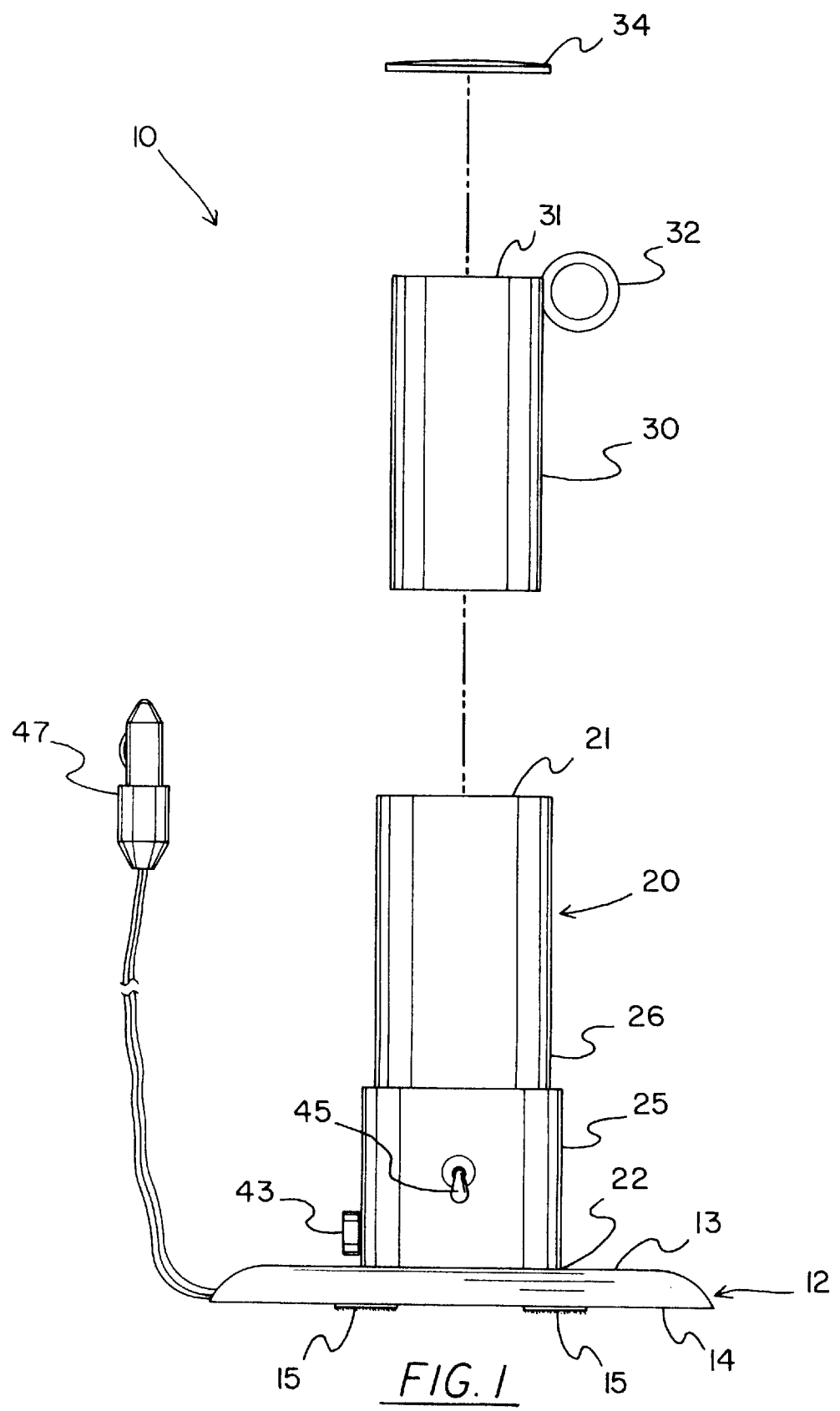
FIG. 1 is a schematic exploded side view of a new cup warmer holder according to the present invention.

With reference now to the drawings, and in particular to FIGS. 1 through 4 thereof, a new cup warmer holder embodying the principles and concepts of the present invention and generally designated by the reference numeral 10 will be described.

As best illustrated in FIGS. 1 through 4, the cup warmer holder 10 generally comprises a base 12 having upper and lower surfaces 13,14 with a receiving member 20 extending from the upper surface 13. The receiving member 20 has a central bore 23 extending between its top 21 and the bottom 22. A cup 30 with an open top 31 and a handle 32 positioned towards its top 31 is removably inserted through the top 21 of the receiving member 20 into the central bore 23 of the receiving member 20. A heater 40 is provided for heating an item within the central bore 23 of the receiving member 20.

Figure 2:
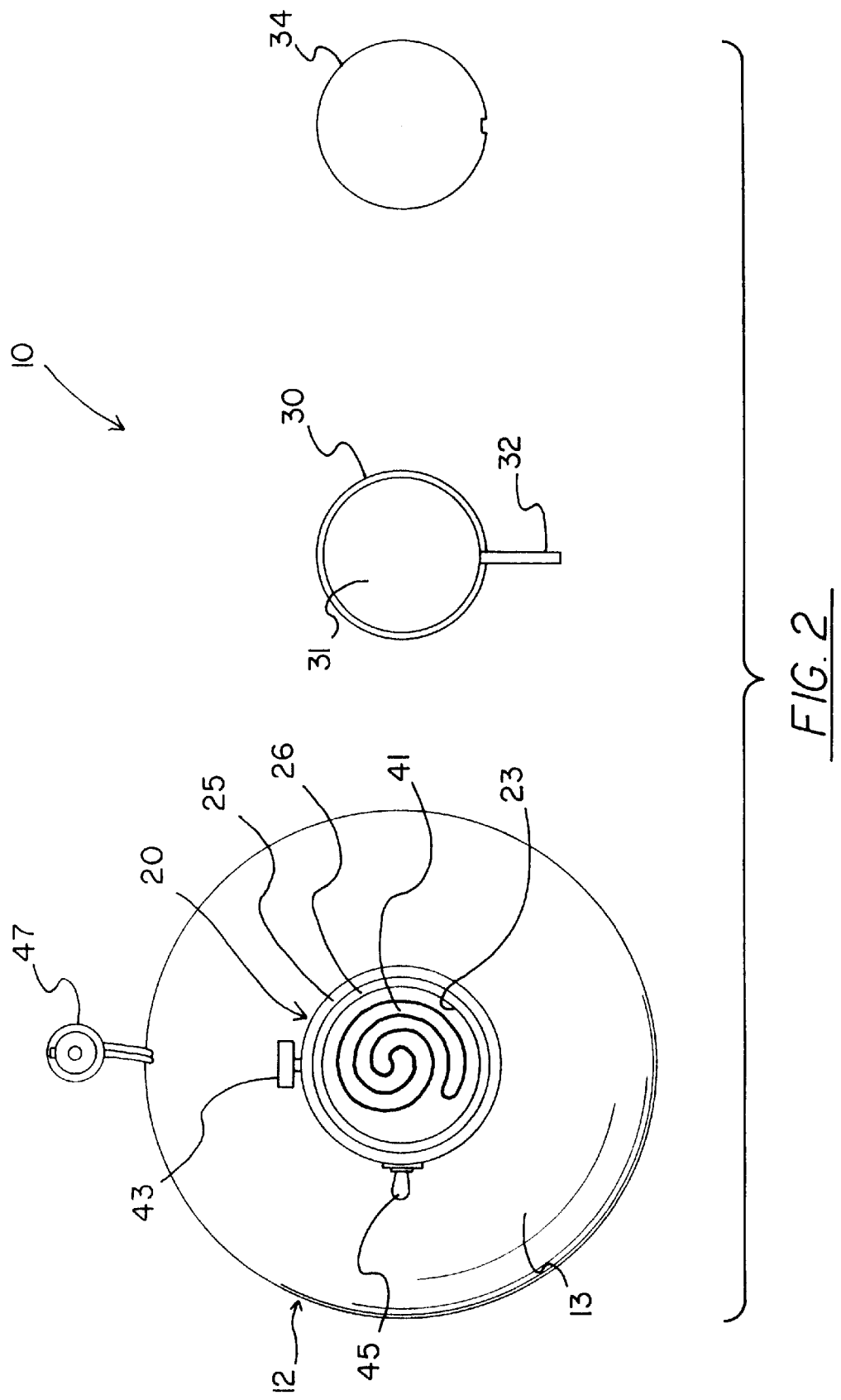
FIG. 2 is a schematic top side view of the elements of the present invention.
Figure 3:
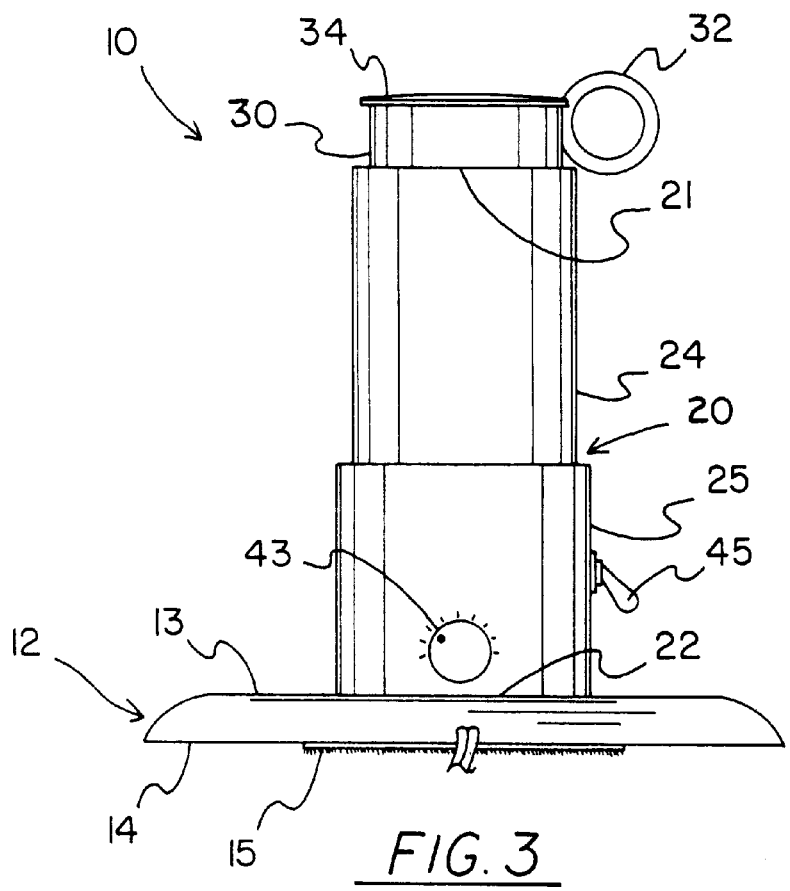
FIG. 3 is a schematic side view of the present invention with the cup inserted into the receiving member.

The cup warming holder device 10 is designed for holding and warming a hot beverage container, such as the cup 30, to a surface, such as an interior surface of a vehicle. With reference to FIGS. 2 and 3, the base 12 is generally circular and has upper and lower surfaces 13,14. The lower surface 14 of the base is designed for resting of a surface. Preferably, the lower surface 14 of the base 12 is designed so that it is attachable to a surface. Ideally, this is achieved by providing a portion of a hook and loop fastener 15 provided on the lower surface 14 for coupling the lower surface 14 of the base 12 to a surface, or to a surface having a complementary portion of a hook and loop fastener on it.

As illustrated in FIG. 3, the receiving member 20 is extended from the upper surface 13 of the base 12. Preferably, the receiving member 20 is centrally positioned on the upper surface 13 of the base 12. The receiving member 20 has a top 21 and a bottom 22 with a central bore 23 extending between the top 21 and the bottom 22. The central bore 23 is preferably generally cylindrical and is designed for receiving a cup 30 therein. Ideally, the receiving member 30 has upper and lower portions 24,25 with the upper portion 24 positioned towards its top 21 and the lower portion 25 positioned towards its bottom 22. The upper and lower portions 24,25 are generally cylindrical with the diameter of the lower portion 25 being greater than the diameter of the upper portion 24, The cup 30 is designed for holding a beverage therein. The cup is preferably cylindrical and has an open top 31 and a handle, 32 positioned towards the top 31. The cup 30 is removably inserted through the top 21 of the receiving member 20 into the central bore 23 of the receiving member 20 such that the cup 30 is held upright within the receiving member 20. A removable circular lid 34 may be included to cover the open top of the cup. The lid 34 is designed for helping keep the contents of the cup 30 warm and for helping prevent spillage of the contents from the cup 30.

Figure 4:
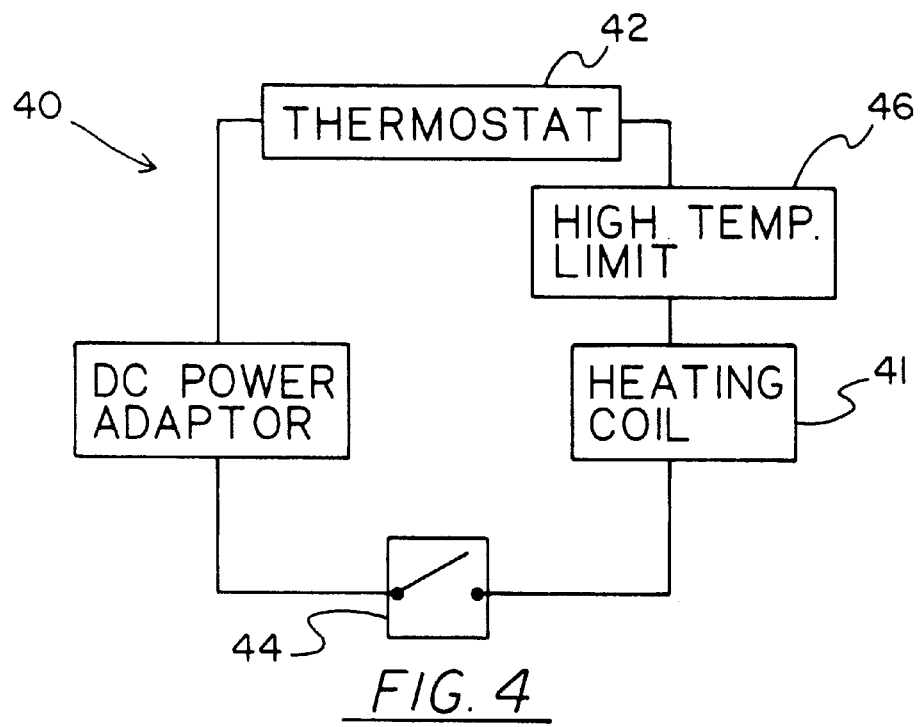
FIG. 4 is a schematic circuit diagram of the heater of the present invention.

The cup warmer holder 10 also includes a heater 40 for heating an item within the central bore 23 of the receiving member 20. With particular reference to FIG. 4, the heater includes a heating element 41, a thermostat 42 and a switch 44. The heating element 41 is designed for providing heat when powered and is provided on the upper surface 13 of the base 12. Preferably, the heating element 41 is centrally positioned on the base 12 so that the heating element 41 is aligned with the central bore 23 of the receiving member 20 such that items within the central bore 23 are heated by the heating element 41.

The thermostat 42 is designed for controlling the temperature (or amount) of heat provided by the heating element 41 and is electrically coupled to the heating element 41. Preferably, the thermostat 42 has a control actuator 43 provided on the outer surface of the receiving member 20 for controlling the thermostat 42. Ideally, the control actuator 43 is positioned towards the bottom 22 of the receiving member 20 and located on the lower portion 25 of the receiving member 20.

The switch 44 is designed for selectively powering the heating element 41 and is also electrically coupled to the heating element 41. The switch 44 preferably includes an actuator 45 provided on the outer surface of the receiving member 20 that is, ideally, positioned towards the bottom 22 of the receiving member 20 on its lower portion 25.

Preferably, the heater 40 also includes a high temperature limiter 46 electrically coupled to the heating element 41 for limiting the heat provided by the heating element 41 to a predetermined maximum temperature to prevent the heating element 41 from heating beverage containers within the receiving member 20 to dangerously hot temperatures. Ideally, the heater 40 includes a plug member 47 electrically coupled to the heating element 41 for insertion into an electric socket. The plug member 47 is most preferably adapted to fit an electric cigarette lighter socket of a vehicle to electrically couple the heating element 41 to a power source.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cup warming holder device, comprising:
   a base having upper and lower surfaces, said lower surface of said base being for resting on a surface;
   a receiving member being extended from said upper surface of said base, said receiving member having a top, a bottom, an outer surface, and a central bore, said central bore of said receiving member being extended between said top and said bottom of said receiving member;
   wherein an outer periphery of said base has a diameter greater than an outer diameter of an outer periphery of said receiving member for enhancing stability by resisting overturning of said base and receiving member, wherein said diameter of said base is at least two and a half times said diameter of said receiving member;
   a cup having an open top and a handle, said handle of said cup being positioned towards said top of said cup, said cup being removably inserted through said top of said receiving member into said central bore of said receiving member; and
   a heater for heating an item within said central bore of said receiving member.

2. The device of claim 1, wherein said heater includes:
   a heating element for providing heat when powered, said heating element being provided on said upper surface of said base, said heating element being aligned with said central bore of said receiving member such that items within said central bore of said receiving member are heated by said heating element;
   a thermostat being electrically coupled to said heating element; and
   a switch being electrically coupled to said heating element.

3. The device of claim 2, wherein said heater further includes a high temperature limiter being electrically coupled to said heating element, said high temperature limiter limiting the heat provided by said heating element to a predetermined maximum temperature.

4. The device of claim 2, wherein said heater further includes a plug member for insertion into an electric socket electrically coupled to said heating element.

5. The device of claim 4, wherein said plug member is adapted to fit an electric cigarette lighter socket of a vehicle.

6. The device of claim 2, wherein said receiving member is centrally positioned on said upper surface of said base, and wherein said heating element is centrally positioned on said base.

7. The device of claim 2, wherein said thermostat has a control actuator for controlling said thermostat being provided on said outer surface of said receiving member.

8. The device of claim 2, wherein said switch has an actuator being provided on said outer surface of said receiving member.

9. The device of claim 1, wherein said base is generally circular, wherein said central bore of said receiving member is generally cylindrical, and wherein said cup is generally cylindrical.

10. The device of claim 9, wherein said receiving member has upper and lower portions, said upper and lower portions being generally cylindrical and each having a diameter, and said diameter of said lower portion of said receiving member being greater than said diameter of said upper portion of said receiving member.

11. The device of claim 1, wherein said lower surface of said base is attachable to a surface.

12. The device of claim 1, wherein said lower surface of said base has a portion of a hook and loop fastener provided thereon for coupling said lower surface of said base to a surface.

13. The device of claim 1, further comprising a removable lid substantially covering said open top of said cup.

14. A cup warming holder device, comprising:
   a base being generally circular and having upper and lower surfaces;
   said lower surface of said base being for resting on a surface, said lower surface of said base being attachable to a surface, said lower surface of said base having a portion of a hook and loop fastener provided thereon for coupling said lower surface of said base to a surface;
   a receiving member being extended from said upper surface of said base, said receiving member being centrally positioned on said upper surface of said base, said receiving member having a top, a bottom, an outer surface, and a central bore, said central bore of said receiving member being extended between said top and said bottom of said receiving member, said central bore of said receiving member being generally cylindrical;
   wherein said receiving member has upper and lower portions, said upper and lower portions being generally cylindrical and each having a diameter, said diameter of said lower portion of said receiving member being greater than said diameter of said upper portion of said receiving member;

a cup being generally cylindrical and having an open top and a handle, said handle of said cup being positioned towards said top of said cup, said handle having an annular configuration, said cup being removably inserted through said top of said receiving member into said central bore of said receiving member;

a removable lid substantially covering said open top of said cup; and a heater for heating an item within said central bore of said receiving member;

said heater including:
 a heating element for providing heat when powered, said heating element being provided on said upper surface of said base, said heating element being centrally positioned on said base, said heating element being aligned with said central bore of said receiving member such that items within said central bore of said receiving member are heated by said heating element;
 a thermostat being electrically coupled to said heating element, said thermostat having a control actuator for controlling said thermostat being provided on said outer surface of said receiving member;
 a switch being electrically coupled to said heating element, said switch having an actuator being provided on said outer surface of said receiving member;
 a high temperature limiter being electrically coupled to said heating element, said high temperature limiter limiting the heat provided by said heating element to a predetermined maximum temperature; and
 a plug member for insertion into an electric socket electrically coupled to said heating element, said plug member being adapted to fit an electric cigarette lighter socket of a vehicle;

wherein said diameter of said base is two and a half times said diameter of said receiving member.

15. The device of claim 1, wherein said handle has an annular configuration.

* * * * *